(12) United States Patent
Kothari et al.

(10) Patent No.: US 8,584,147 B2
(45) Date of Patent: Nov. 12, 2013

(54) MANAGED EXECUTION ENVIRONMENT FOR SOFTWARE APPLICATION INTERFACING

(75) Inventors: Nikhil Kothari, Sammamish, WA (US); Stefan N. Schackow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1437 days.

(21) Appl. No.: 11/614,945

(22) Filed: Dec. 21, 2006

(65) Prior Publication Data

US 2008/0155554 A1    Jun. 26, 2008

(51) Int. Cl.
*G06F 9/54*    (2006.01)
(52) U.S. Cl.
USPC .......................................... 719/328; 717/124
(58) Field of Classification Search
None
See application file for complete search history.

(56) References Cited

U.S. PATENT DOCUMENTS

| | | | |
|---|---|---|---|
| 5,956,709 A | 9/1999 | Xue |
| 6,188,401 B1 | 2/2001 | Peyer |
| 6,266,681 B1 | 7/2001 | Guthrie |
| 6,826,726 B2 | 11/2004 | Hsing et al. |
| 6,981,212 B1 | 12/2005 | Claussen et al. |
| 2002/0088008 A1 | 7/2002 | Market |
| 2003/0074634 A1 | 4/2003 | Emmelmann |
| 2004/0044966 A1 | 3/2004 | Malone |
| 2004/0194020 A1 | 9/2004 | Beda et al. |
| 2005/0086587 A1 | 4/2005 | Balz |
| 2005/0183076 A1 | 8/2005 | Colangelo et al. |
| 2006/0129921 A1 | 6/2006 | Relyea et al. |

FOREIGN PATENT DOCUMENTS

| | | |
|---|---|---|
| EP | 1221661 | 7/2002 |
| WO | 2004031984 | 4/2004 |
| WO | WO2006075872 | 7/2006 |

OTHER PUBLICATIONS

Firebug—web development evolved, archived Dec. 5, 2006, retrieved Aug. 2010, http://web.archive.org/web/20061205103626/www.getfirebug.com/, 15 pages.*
Thomas McGuire, Firefox Tweak Guide, archived Jan. 3, 2006, retrieved Aug. 4, 2010, http://web.archive.org/web/20060103040524/http://www.techspot.com/tweaks/firefox/firefox-5.shtml, 5 pages.*
Microsoft Computer Dictionary; Microsoft Press; Fifth Edition; May 1, 2002; p. 246.*
Joe Hewitt; http://web.archive.org/web/20060117033232/http://www.joehewitt.com/software/firebug/; archived Jan. 17, 2006; 2 pages.*

(Continued)

*Primary Examiner* — H S Sough
*Assistant Examiner* — Kimberly Jordan
(74) *Attorney, Agent, or Firm* — Workman Nydegger

(57) ABSTRACT

Some embodiments are directed to controlling interactions between a host software program and a computer system by providing a managed execution environment running within the host software program. In one embodiment, a computer system integrates a managed execution environment within a host software program. The computer system uses the managed execution environment to interact with one or more features of the host software program. The managed execution environment includes interface controls configured to interface between the computer system and the host software program. The compute system alters one or more of the various software program features based on code that is identified in downloaded content.

19 Claims, 3 Drawing Sheets

(56) References Cited

OTHER PUBLICATIONS

Encytemedia; http://web.archive.org/web/20060520101502/http://encytemedia.com/blog/articles/2006/05/12/an-in-depth-look-at-the-future-of-javascript-debugging-with-firebug; May 12, 2006; archived May 20, 2006; 5 pages.*

"Javascript", Dec. 20, 2006, retrieved from the Internet: http://en.wikipedia.org/w/index.php?title=javascript&oldId=95613905, pp. 1-6.

W3C, "Document Object Model (DOM) Level 1 Specification", Oct. 1, 1998, retrieved from the Internet: http://www.w3.org/TR/1998/REC-DOM-Level-1-19981001/>, pp. 1-3.

"Document Object Model", Dec. 5, 2006, retrieved from the Internet: http://en.wikipedia.org/w/index.php?title=Document_Object_Model&oldId=92292745>, pp. 1-4.

"AJAX", Dec. 20, 2006, http://en.wikipedia.org/w/Index.php?title=AJAX_(programming)&oldId=95555098>, entire document.

A Runtime System for Interactive Web Services, Claus Brabrand, Anders Moller, Anders Sandholm, Michael I. Schwarlzbach, Mar. 1, 1999, 18 pages.

SDK's Programmer Guide; 197 pages, 2005.

Intermediary Architecture: Interposing Middleware Object Services between Web Client and Server; Craig Thompson, Paul Pazandak, Venu Vasudevan, Frank Manola, Mark Plamer, Gil Hansen and Tom Bannon, 1999, 5 pages.

* cited by examiner

MANAGED EXECUTION ENVIRONMENT FOR SOFTWARE APPLICATION INTERFACING

BACKGROUND

Computers are used all over the world to perform a wide variety of tasks. Computers perform these tasks by processing software code which contains commands that are interpreted (or compiled) and executed by the computer. Software code is typically written by a developer using one or more scripting or programming languages. Many software programs are designed to interact with and process code and/or scripts written by other software developers. Such programs, however, often limit the types of scripts and/or code with which the software programs can interact. This is done primarily for reasons of compatibility and security.

One example of a software program designed to interact with code written by other developers is an internet browser. Internet browsers are designed to read files that describe the contents and layout of a web page (e.g., a Hypertext Markup Language (HTML) file) and display the web page according to the layout described in the file. The web page may include scripts (such as those written in JAVASCRIPT®), other text, or references to graphics files or objects such as ADOBE® SHOCKWAVE® or MICROSOFT® ACTIVEX® elements. The code for such scripts and references to objects and other elements can be embedded directly in the HTML file. Most browsers are designed to be able to read and display web pages that have incorporated a plurality of scripts, objects and other elements, although this may involve the installation of updates and/or plug-ins to properly display some objects.

Increasingly, there is a demand for easy-to-use, fast-loading, customized web pages. This demand has led to the development of new browser-based code implementations for processing and displaying web pages. One example of such an implementation is a scripting language that combines JavaScript and Extensible Markup Language (XML), the merger of which form Asynchronous JavaScript and XML (AJAX). AJAX is commonly used to develop complex software functions used by browsers to generate and display complex, dynamic web pages. Such complex functions often result in large files, frequently in the hundreds of kilobytes range. Such large files often take extensive amounts of time to download and/or process.

Furthermore, scripting languages such as JavaScript, XML and AJAX have limited capabilities in comparison with other full-fledged programming languages such as C++, C# and Visual Basic. Versatile programming languages such as these are much better suited for building complex programming interactions between software programs. Many times, however, browsers and other applications designed to read and implement code written by other developers are geared toward running scripts and are not designed to run code written in high-level languages such as C++, C# and Visual Basic.

BRIEF SUMMARY

Embodiments of the present invention are directed to controlling interactions between a host software program and a computer system by providing a managed execution environment running within the host software program. In one embodiment, a computer system integrates a managed execution environment within a host software program. The computer system uses the managed execution environment to interact with one or more features of the host software program. The managed execution environment includes controls configured to interface between the computer system and the host software program. The managed execution environment alters one or more of the various software program features based on code that is identified in downloaded content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention are directed to controlling interactions between a host software program and a computer system by providing a managed execution environment running within the host software program. In one embodiment, a computer system integrates a managed execution environment within a host software program. The computer system uses the managed execution environment to interact with one or more features of the host software program and alters one or more of the various software program features based on code that is identified in downloaded content. The embodiments of the present invention may comprise a special purpose or general-purpose computer including various types of computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
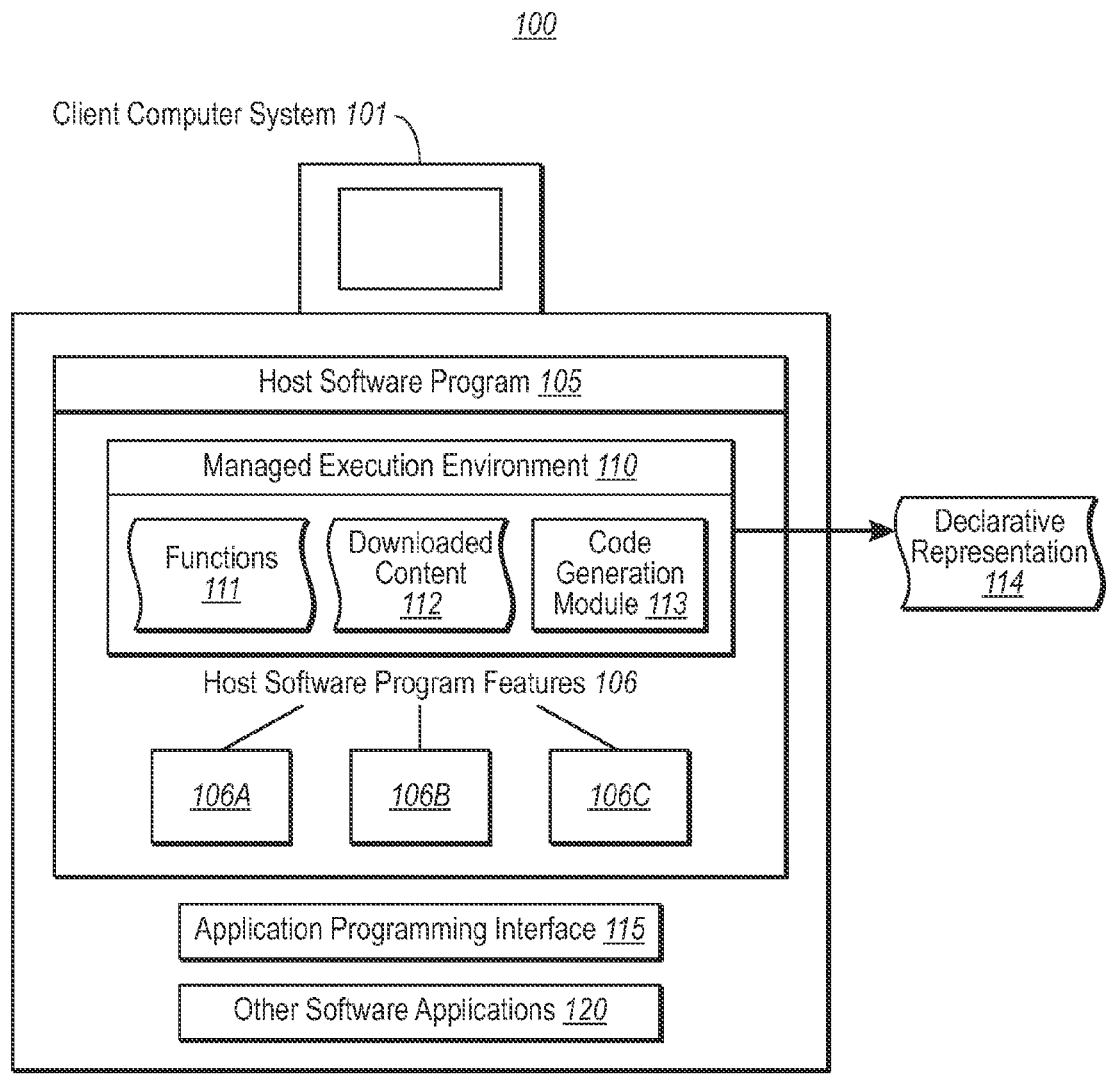
FIG. 1 illustrates a computer architecture in which embodiments of the present invention may operate including controlling interactions between a host software program and a computer system.

FIG. 1 illustrates a computer architecture 100 in which the principles of the present invention may be employed. Computer architecture 100 includes client computer system 101. In some embodiments, client computer system 101 is configured to store and process one or more software programs. Typically, such software programs are accessed and opened via an operating system (OS). Client computer system 101 includes host software program 105.

Host software program 105 may be any type of software program that can be configured to run on client computer system 101. Host software program 105 includes host software program features 106. Host software program features 106 includes three features, 106A, 106B and 106C. It should be noted that the number of host software program features illustrated was chosen arbitrarily and may include more or less than three features. A host software program feature 106 may include any type or portion of functionality that is useful to host software program 105. For example, if host software program 105 was a word processor, a feature might be a thesaurus, a spell-checker, a tables wizard, or any other piece of functionality within the word processing program. Client computer system 101 includes not only host software program 105 but also other software programs 120. These other software programs may also be any type of software program that can be configured to run on client computer system 101.

Host software program 105 also includes managed execution environment 110. The term "managed execution environment," as it is used herein, refers to interface controls configured to interface between a computer system and a host software program. For example, in some embodiments, managed execution environment 110 may include controls configured to interface between client computer system 101 and host software program 105. The interface controls may be used to regulate communication between client computer system 101 and host software program 105.

Furthermore, managed execution environment 110 includes functions 111, downloaded content 112 and code generating module 113. Functions 111 may include any type of software function including a script, an executable assembly file, or merely a function within an assembly file. Downloaded content 112 may include any type of content that may be downloaded from another computer system and/or computer network. Such content includes, but is not limited to, text, graphics, media (e.g., movies, audio, video clips, etc.), scripts, functions, or any other content that may be downloaded. Code generating module 113 may be configured to generate code including text, scripts or entire functions. Code may be generated in response to downloaded content, as will be explained in greater detail below.

Client computer system 101 also includes declarative representation 114. A "declarative representation," as used herein, is a representative model of an object's structure or layout. More specifically, a declarative representation may be a model representing how a user intends to alter the object's structure or layout. For example, a user may create a declarative representation of a document object model, which is used to describe the structure or layout of an HTML web page. The declarative representation may depict how the user intends to alter the web page's document object model and thus affect how the web page will ultimately be displayed.

Client computer system 101 also includes application programming interface 115. "Application programming interface," as the term is used herein, includes any means for interfacing between an application and an operating system. Furthermore, application programming interface 115 may interface with any software application, whether the application was included with the operating system or was installed separately.

Figure 2:
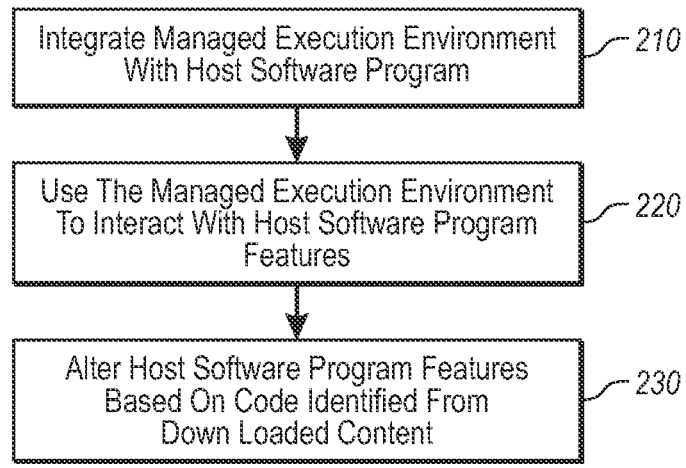
FIG. 2 illustrates a flowchart of an example method for controlling interactions between a host software program and a computer system.

FIG. 2 illustrates a flowchart of a method 200 for controlling interactions between a host software program and a computer system. The method 200 will now be described with frequent reference to the components and data of environment 100.

Method 200 includes an act of integrating the managed execution environment within the host software program (act 210). For example, managed execution environment 110 may be integrated within host software program 105 in client computer system 101. The term "integrating," as used herein, may refer to installing and running managed execution environment 110 in host software program 105 as a plug-in. Or, alternatively, managed execution environment 110 may already be a part of host software program 105 and "integrating" may refer to calling managed execution environment 110's functionality from within host software program 105. In both cases, managed execution environment 110 is integrated and run within host software program 105.

Although in some embodiments managed execution environment 110 may be designed to run as a plug-in to host software program 105, in some alternative embodiments, managed execution environment 110 may be designed to run as a standalone program. Thus, for example, a computer user using client computer system 101 would be able to open managed execution environment 110 as an application separate from host software program 105. However, whether run as a plug-in or as a standalone application, managed execution environment 110 performs substantially the same functions.

Method 200 includes an act of using the managed execution environment to interact with one or more features of the host software program, the managed execution environment comprising interface controls configured to interface between the computer system and the host software program (act 220). For example, managed execution environment 110 may be used to interact with feature 106A of host software program 105, where managed execution environment 110 comprises interface controls configured to interface between client computer system 101 and host software program 105. As explained above, managed execution environment 110 may be used to interact with host software program features 106. In one embodiment, where host software program 105 is a word processing program, software feature 106A may represent a thesaurus, feature 106B may represent a spell-checker and feature 106C may represent a tables wizard. Managed execution environment 110 may be used to interact with these or other features of the word processing program.

Method 200 includes an act of the managed execution environment altering one or more of the various host software program features based on code that is identified in downloaded content (act 230). For example, managed execution environment 110 may alter software program feature 106A based on code that is identified in downloaded content (e.g., downloaded content 112). As explained above, downloaded content 112 may include any type of text, graphics, scripts, functions or any other type of content that may be downloaded from a local or remote computer system via a network. The identified code may include any type of computer code including scripts, functions, compiled assemblies or other form of computer code.

In some embodiments, managed execution environment 110 may load the identified code, initialize the code inside of host software program 105, and transfer control to entry points in managed execution environment 110. In some cases, processing the code in such a manner provides access to objects within the software program features such as the root document, the immediate parent content element, and current uniform resource identifier (URI) of the software feature (e.g., software features 106).

In other embodiments, a computer user may generate a declarative representation of the managed execution environment's interaction with various software program features. For example, a user may generate a declarative representation of managed execution environment 110's interaction with host software program features 106B and 106C. In some embodiments, a software program developer may use a graphical tool to generate a declarative representation of the managed execution environment's interaction with, for example, host software program features 106B and 106C. In some cases, the declarative representation may represent the desired outcome of the interaction between managed execution environment 110 and host software program features (e.g., 106B and 106C).

In some embodiments, managed execution environment 110 automatically downloads software updates used to update the managed execution environment 110. Additionally or alternatively, managed execution environment 110 may automatically download software updates used to update any of the software program features 106. In other embodiments, managed execution environment 110 may receive a function call from one of the various host software program features 106 for a function provided by the managed execution environment 110 (e.g., function 111). Thus, managed execution environment 110 may provide functions 111 to host software program features 106, and may receive functions as code identified in downloaded content 112, thus illustrating the bidirectional nature of the interface provided by managed execution environment 110. Furthermore, in some embodiments, managed execution environment 110 may be configured to generate code on demand based on the downloaded content.

Figure 3:
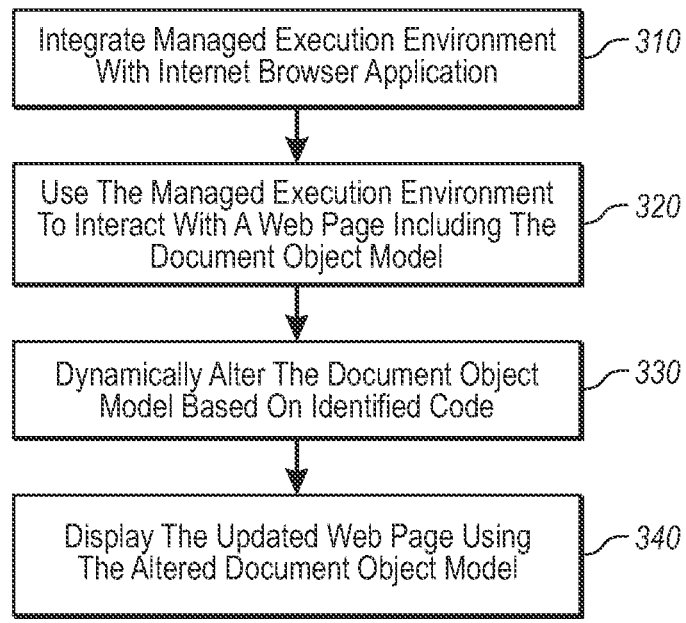
FIG. 3 illustrates a flowchart of an alternative example method for controlling interactions between an internet browser application and a computer system.
Figure 4:
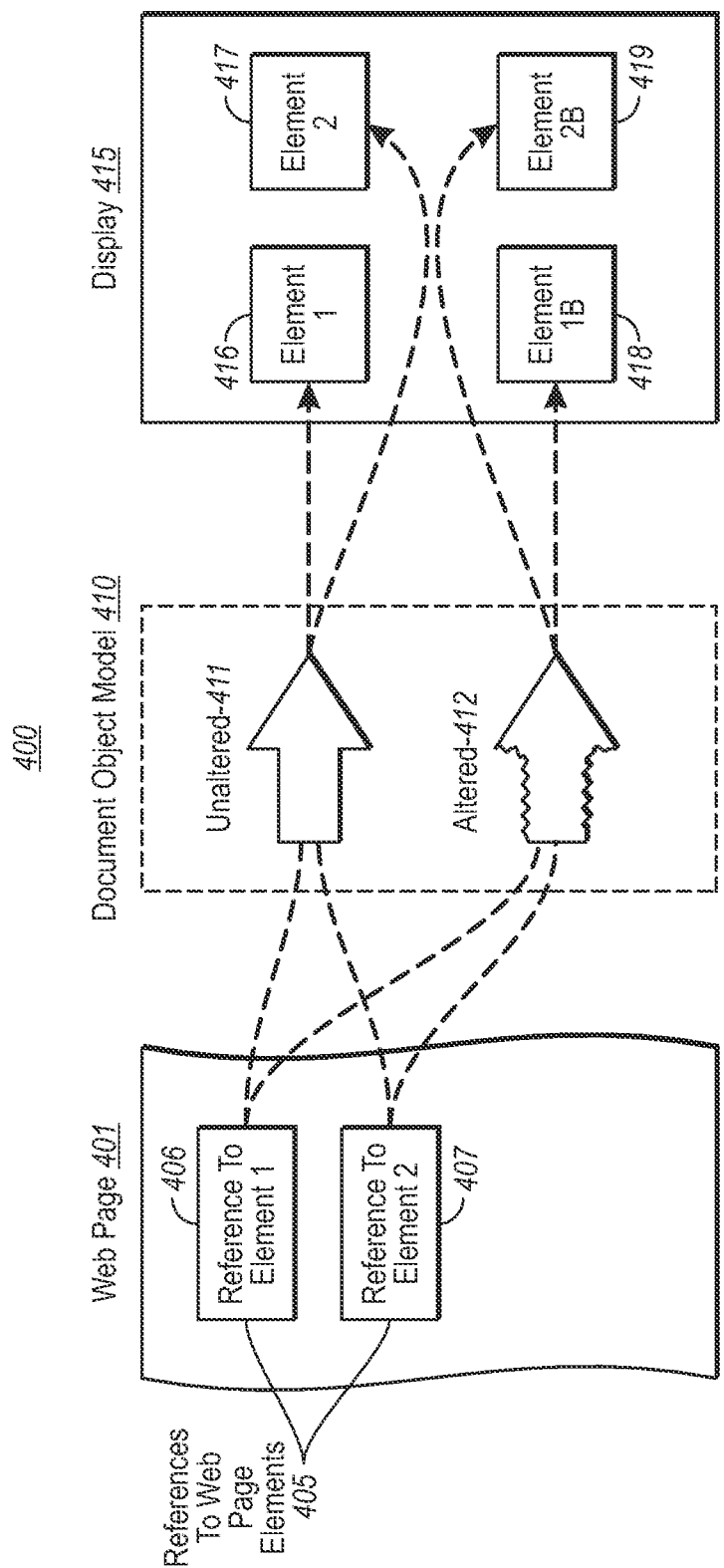
FIG. 4 illustrates an embodiment of the present invention in which web pages are rendered using a document object model.

FIG. 3 illustrates a flowchart of a method 300 for controlling interactions between an internet browser application and a computer system by providing a managed execution environment running within the internet browser application. FIG. 4 illustrates an embodiment of the present invention in which web pages are rendered using a document object model. The method 300 and embodiment 400 will now be described with frequent reference to the components and data of environment 100.

Method 300 includes an act of integrating the managed execution environment within the internet browser application (act 310). For example, managed execution environment 110 may be integrated within an internet browser application. As explained above with regard to host software program 105, an internet browser application may include managed execution environment 110 as part of the application or, alternatively, managed execution environment 110 may be added on separately as a plug-in using the browser's extensibility model. In some embodiments, an internet browser application may act as a host software program as represented by host software program 105 in client computer system 101.

Method 300 includes an act of using the managed execution environment to interact with a web page including a document object model, the document object model representing a structural outline of the web page including programmatically accessible elements, the managed execution environment comprising interface controls configured to interface between the computer system and the internet browser application (act 320). For example, managed execution environment 110 may be used to interact with web page 401 including document object model 410. Document object model 410 may represent a structural outline of web page 401 including references to web page elements 405. Managed execution environment 110 may include interface controls configured to interface between client computer system 101 and the internet browser application.

Method 300 includes an act of dynamically altering the document object model based on code that is identified in downloaded content (act 330). For example, document object model 410 may be dynamically altered based on code that is identified in downloaded content 112. In some cases, the code is referenced in downloaded content 112, the reference is identified, and the code is downloaded on demand.

In some embodiments, elements referenced by document object model 410 are dynamically altered. An element is any object that is either part of or referenced in the web page HTML file. In one example, web page 401 may contain reference to element 1 (406) and reference to element 2 (407), as well as other references to other elements (not shown in FIG. 4—it should be noted that any number of references to elements can exist in web page 401). Normally, when an internet browser application accesses a document object model to determine the layout of the web page, the document object model does not alter the layout of the elements and the elements are displayed according to where they are referenced in the web page. For example, in a web page that includes HTML and references to elements 405, the element is ultimately displayed based on where the reference is placed in the web page's HTML (e.g., reference to element 1 (406) would be displayed above reference to element 2 (407) because 406 precedes 407 in the web page layout. Continuing this example, the document object model 410 would normally identify where each element was placed in the web page HTML and display it unaltered (as shown passing through unaltered arrow 411).

However, in some embodiments of the present invention, elements may be altered (as shown passing through altered arrow 412) because the document object model has been altered (see act 330 above). Altered document object model 410 may alter one or more characteristics of the element. For example, altered document object model 410 may alter where on the web page the element is displayed, the color or style of the element, the font, size, or any other element attribute. In some embodiments, elements that are dynamically altered include those elements that are accessible via a scripting application interface. In other embodiments, the dynamically altered elements include the web page's HTML or XML itself. Additionally or alternatively, the dynamically altered elements may include web page content created by one or more different browser markup languages and/or content models.

In some embodiments, one or more additional programming frameworks are used to dynamically alter the document object model. For example, a programming framework that allows for dynamic language support may be used. Thus, when the document object model 410 is used to render the web page, the programming framework that allows for dynamic language support can dynamically interpret and run code on the web page.

Method 300 includes an act of displaying the web page using the altered document object model (act 340). For example, web page 401 may be displayed on display 415 using altered document object model 412. In cases where elements are displayed unaltered (those elements shown passing through unaltered document object model 411), the result is the displaying of unaltered elements 416 (Element 1) and 417 (Element 2). Additionally or alternatively, in cases where elements are altered before they are displayed (those elements shown passing through altered document object model 412), the result is the displaying of altered elements 418 (Element 1B) and 419 (Element 2B). Thus, if the elements referenced in reference to element 1 (406) and reference to element 2 (407) were an ActiveX® object and a JavaScript® script, respectively, in the former case, the elements would be processed and displayed unaltered from the original layout and in the latter case, the elements would be processed and displayed in a layout altered from the original (e.g., the JavaScript® script may now execute or appear before the ActiveX® object in the web page, or they may be in different colors, different fonts, different sizes, etc.).

In some embodiments, a declarative representation of the managed execution environment's interaction with browser content may be generated by managed execution environment 110. As explained above, a declarative representation is a representative model of an object's structure or layout. In one embodiment, the declarative representation is a model that represents the desired altered layout of the document object model. Another example would be a declarative representation that maps portions of the document object model to specific programmatic constructs (e.g., elements 111, 112 and 113).

In some embodiments, it may be possible to use multiple managed execution environments to dynamically generate and/or alter the content of a web page (e.g., web page 401). For example, one managed execution environment 110 may be assigned to each element in the web page so as to increase processing speed and decrease web page loading time. In some embodiments, rich network connectivity may be integrated with the internet browser application or other host software program 105. In some cases, this would greatly enhance the usability and functionality of the host software program.

In other embodiments, the managed execution environment 110 may receive a function call from one of the programmatically accessible elements of the web page for a function provided by the managed execution environment 110. As mentioned above, managed execution environment 110 may include functions 111 that can be provided to other web page elements or software program features 106. Managed execution environment 110 includes a bi-directional interface that allows the environment 110 to interact with host software program 105, other software programs 120, and host software program features as well as allow those same programs and features to communicate with and request information from the managed execution environment 110.

Thus, embodiments of the present invention are directed to controlling interactions between a host software program and a computer system by providing a managed execution environment running within the host software program. In one embodiment, a computer system integrates a managed execution environment within a host software program, uses the managed execution environment to interact with features of the host software program and alters one or more of the various software program features based on code that is identified in downloaded content The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for implementing a method for controlling interactions between a host software program and a computer system by providing a managed execution environment running within the host software program, the computer program product comprising one or more physical computer-readable media having thereon computer-executable instructions that, when executed by one or more processors of the computing system, cause the computing system to perform the method, the method comprising:
   integrating the managed execution environment within the host software program, the host software program comprising one or more features providing functionality;
   using the managed execution environment to interact with the one or more features, the managed execution environment comprising interface controls configured to interface between the computer system and the host software program;
   identifying code in downloaded content;
   the managed execution environment loading the identified code;
   the managed execution environment altering one or more of the one or more features of the host software program based on the code that is identified in the downloaded content;
   the managed execution environment initializing the identified code inside of the host software program; and
   the managed execution environment transferring control of the initialized identified code to entry points in the managed execution environment and providing access to objects within at least one of the one or more features.

2. The computer program product of claim 1, wherein the method further comprises the managed execution environment receiving a function call from one of the one or more features for a function provided by the managed execution environment.

3. The computer program product of claim 1, wherein the method further comprises generating a declarative representation of the managed execution environment's interaction with one or more of the one or more features.

4. The computer program product of claim 3, wherein a software program developer uses graphical tools to generate a declarative representation of the managed execution environment's interaction with the one or more of the one or more features.

5. The computer program product of claim 1, wherein the method further comprises the managed execution environment automatically downloading software updates used to update the managed execution environment or at least one of the one or more features.

6. The computer program product of claim 1, wherein the managed execution environment is added on to the host software program as a plug-in.

7. The computer program product of claim 1, wherein the method further comprises the managed execution environment generating code on demand based on the downloaded content.

8. A computer program product for implementing a method for controlling interactions between an internet browser application and a computer system by providing a managed execution environment running within the internet browser application, the computer program product comprising one or more physical computer-readable media having thereon computer-executable instructions that, when executed by one or more processors of the computing system, cause the computing system to perform the method, the method comprising
    integrating the managed execution environment within the internet browser application, the internet browser application comprising one or more features providing functionality;
    using the managed execution environment to interact with a web page including a document object model, the document object model representing a structural outline of the web page including programmatically accessible elements, the managed execution environment comprising interface controls configured to interface between the computer system and the internet browser application;
    dynamically altering the document object model based on code that is identified in downloaded content;
    the managed execution environment loading the identified code;
    the managed execution environment initializing the identified code inside of the internet browser application;
    the managed execution environment transferring control of the initialized identified code to entry points in the managed execution environment and providing access to objects within at least one of the one or more features; and
    displaying the web page using the altered document object model.

9. The computer program product of claim 8, wherein the method further comprises dynamically altering elements referenced by the document object module.

10. The computer program product of claim 9, wherein the dynamically altered elements include those elements that are accessible via a scripting application interface.

11. The computer program product of claim 9, wherein the dynamically altered elements include the web page's HTML.

12. The computer program product of claim 8, wherein the method further comprises the managed execution environment receiving a function call from one of the programmatically accessible elements for a function provided by the managed execution environment.

13. The computer program product of claim 8, wherein the method further comprises generating a declarative representation of the managed execution environment's interaction with browser content.

14. The computer program product of claim 8, wherein the managed execution environment is added on to an internet browser application using the browser application's extensibility model.

15. The computer program product of claim 8, wherein the method further comprises using multiple managed execution environments to dynamically generate the content of the web page.

16. The computer program product of claim 8, wherein the code that is identified in downloaded content is downloaded on demand.

17. The computer program product of claim 8, wherein the method further comprises integrating rich network connectivity into the internet browser application.

18. The computer program product of claim 8, wherein dynamically altering the document object model comprises implementing one or more additional programming frameworks.

19. The computer program product of claim 18, wherein the programming framework comprises dynamic language support.

* * * * *